United States Patent [19]

Younger

[11] Patent Number: 5,253,549
[45] Date of Patent: Oct. 19, 1993

[54] METHODS AND SYSTEMS FOR IMPROVING THE OPERATION OF AUTOMATIC TRANSMISSIONS FOR MOTOR VEHICLES

[76] Inventor: Gilbert W. Younger, 2621 Merced Ave., El Monte, Calif. 91733

[21] Appl. No.: 596,063

[22] Filed: Oct. 11, 1990

[51] Int. Cl.$^5$ ............................................. B60K 41/06
[52] U.S. Cl. ..................... 74/867; 92/13.41; 192/109 F
[58] Field of Search .................. 74/867; 192/109 F; 92/13.4, 13.41, 130 R

[56] References Cited

U.S. PATENT DOCUMENTS

| | | | |
|---|---|---|---|
| 2,875,864 | 3/1959 | Kirk | 92/130 R X |
| 2,976,844 | 3/1961 | Goldring | 92/13.41 |
| 3,762,280 | 10/1973 | Kreuter et al. | 92/130 R X |
| 4,449,426 | 5/1984 | Younger | 74/367 |
| 4,501,173 | 2/1985 | Honig | 74/867 |
| 4,595,088 | 6/1986 | Sugano | 192/3.31 X |
| 4,628,795 | 12/1986 | Pickard et al. | 92/13.41 |
| 4,665,776 | 5/1987 | Sugano | 74/867 |
| 4,688,451 | 8/1987 | Sakai et al. | 74/867 |
| 4,722,251 | 2/1988 | Sumiya et al. | 74/867 X |
| 4,881,453 | 11/1989 | Armstrong | 92/130 R X |
| 4,911,036 | 3/1990 | Ueke et al. | 74/869 X |
| 4,930,080 | 5/1990 | Suzuki | 192/109 F X |
| 5,014,599 | 5/1991 | Kocsis et al. | 92/130 R X |
| 5,016,521 | 5/1991 | Haka | 92/130 R X |
| 5,018,434 | 5/1991 | Haka | 92/130 R X |
| 5,090,270 | 2/1992 | Suzuki | 74/867 X |
| 5,103,954 | 4/1992 | Muncke et al. | 192/109 F X |
| 5,119,697 | 6/1992 | Vukovich et al. | 74/867 |

OTHER PUBLICATIONS

"Transgo® 440 Training Parts:Complete Repair Method", Younger, 1989.

*Primary Examiner*—Leslie A. Braun
*Assistant Examiner*—David E. Henn
*Attorney, Agent, or Firm*—Mark P. Stone

[57] ABSTRACT

The present invention provides methods and systems for improving the operation of an automatic transmission for automotive vehicles, particularly automatic transmissions installed by original automobile manufacturers. The methods of the invention employ fluid mechanics and other structural components for modifying signals and responses of the valve body of the original transmissions without making any substantial modifications to the structure of the valve body itself. In one embodiment of the invention, the clearance stroke of a servo-piston is reduced to increase the engagement time resulting in more gradual gear engagement and pressure application at a lower pressure-time ratio. A valve system is provided to rapidly establish a desired system pressure during the clearance stroke, and apply pressure at a controlled rate during the engagement stroke. In other aspects of the invention, downshift is controlled primarily by oil volume and feed hole size, and is not dependent on regulating valves. The method of the present invention significantly reduces the quantity of oil required to operate several sub-systems within the transmission which increases the availability of oil within the system to enable a transmission pump to quickly compensate for abrupt pressure drops through the transmission.

23 Claims, 6 Drawing Sheets

OIL PRESSURE IN FROM MANUAL SELECTOR VALVE.

FROM MANUAL SELECTOR VALVE

METHODS AND SYSTEMS FOR IMPROVING THE OPERATION OF AUTOMATIC TRANSMISSIONS FOR MOTOR VEHICLES

BACKGROUND OF THE INVENTION

The methods and apparatus of the present invention are directed to modification and improvement of automatic transmissions for automotive vehicles of the type installed by the original equipment manufacturers. It is particularly directed to the improvement and modification of automotive transmissions known as "440-s".

The "heart" of an automatic transmission is the valve body. Among other things, the valve body receives input signals in the form of hydraulic pressures to control the shifting pattern and timing of an automatic transmission. A more detailed discussion of the operation and importance of the valve body in an automatic transmission system for automobiles may be found with reference to U.S. Pat. No. 4,449,426, issued to the present inventor on May 22, 1984.

Automatic transmissions installed by original equipment manufacturers are calibrated to provide gear shifts to accommodate the comfort of the driver and passengers. However, the original shifting pattern is generally inefficient from a mechanical point of view and tends to shorten the useful life of the original transmission. Correcting and modifying an original automatic transmission through structural modification of the valve body, is complicated, laborious and expensive.

It is the object of the present invention to correct and modify deficiencies of automatic transmission installed by original equipment manufacturers without making any substantial structural modifications to the valve body itself. The corrections and modifications provided by the methods and systems of the present invention are directed to the employment of fluid mechanics which modify regulation or output signals of the original valve body to operate the sub-systems of the automatic transmission to overcome inherent drawbacks therein. Other objects and advantages of the method and systems of the present invention will become apparent to those skilled in the art from the following discussion.

SUMMARY OF THE INVENTION

The methods and systems of the present invention are adapted to employ fluid mechanics for modifying and correcting the operation of an automatic transmission installed by the original equipment manufacturer without making any substantial structural modifications to the valve body. The methods and systems of the present invention are particularly useful in connection with automatic transmissions commonly referred to in the trade as "440-s". In one aspect of the present invention, the clearance stroke of a servo-piston is reduced to increase the engagement stroke for more gradual engagement over a longer period of time. In conjunction with the reduction of the clearance stroke, a spring system is installed to assure that the pressure applied to the servo-piston more closely matches the actual pressure for engagement over the increased engagement time period to control the engagement stroke.

In further aspects of the invention, valve means are employed together with a feed orifice to provide a rapid threshold fluid pressure applied to the servo-piston in conjunction with the reduced clearance stroke to more quickly commence a reverse engagement stroke. Similarly, valve means and orifice feed cooperate in conjunction with drive engagement. The valve system does not merely provide "on/off" fluid flow, but it coordinates the pressure rise in the overall system to perform several different functions, including providing full flow to the 1-2 band to prevent engagement delay in response to an increase in line pressure.

In other aspects of the invention, downshift of gears is primarily controlled by fluid volume within the system and corresponding adjustments to the feed hole size, thereby avoiding dependency on complicated regulating valves included in the original equipment. The system employs fluidic accumulation for regulation in proportion to fluid flow friction and line pressure, instead of in proportion to modulated pressure (or throttle valve). The higher total tension of springs installed in accordance with the method of the present invention shortens the engagement time at higher motor RPM's and tends to eliminate slides and bumps during gear shifts.

In a further aspect of the invention, the total overall quantity of fluid flow required to operate the different sub-systems of an automative transmission is significantly reduced as compared to the quantity of fluid required for operation of an automatic transmission installed by the original equipment manufacturer. The use of a lesser overall volume of fluid to operate the automatic transmission advantageously tends to reduce or eliminate lockup converter failure by assuring that sufficient fluid will be available for providing the necessary oil to the converter front, and generally reduces sudden line pressure drops by assuring that the transmission pump is operating below its maximum pumping capacity.

The methods and systems of the present invention advantageously correct and modify known disadvantages in the operation of automatic transmissions installed by original equipment manufacturers by modifying pre-existing input and output signals. No substantial structural modifications to the valve body itself are required to result in the operational improvements and functional advantages provided by the present invention.

DESCRIPTION OF THE BEST MODES FOR CARRYING OUT THE INVENTION

Figure 1:
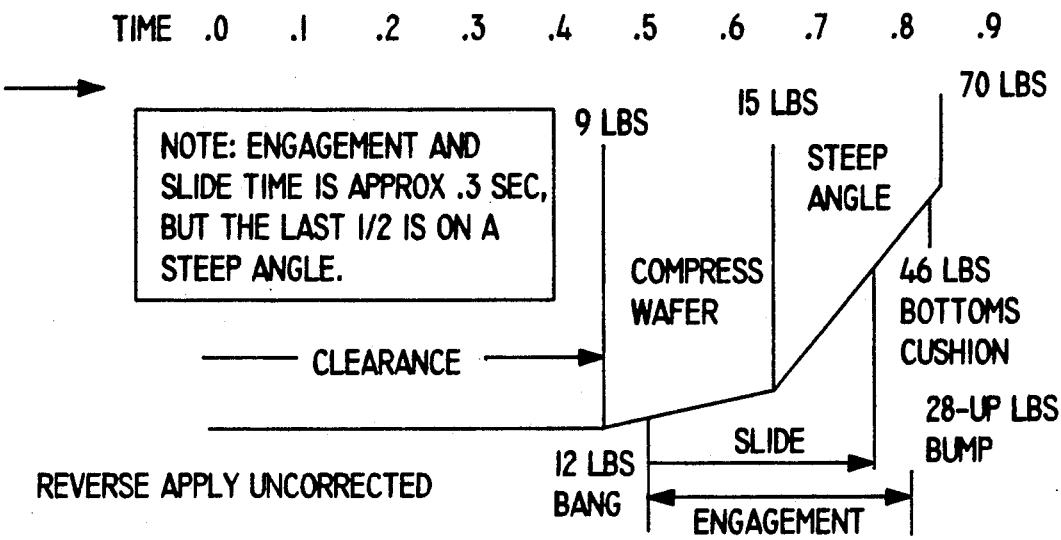
FIG. 1 of the drawings is a graph illustrating uncorrected reverse gear engagement of an automatic transmission.

The methods and systems of the present invention for correcting and modifying automatic transmissions for automotive vehicles will now be discussed with reference to FIGS. 1-5 of the drawing. A publication entitled "TRANSGO ® 440 Training And Parts: Complete Repair Method" which provides specific examples of corrections made in accordance with the method and systems of the present invention is expressly incorporated by reference into the present specification.

As previously noted herein, the valve body of an automatic transmission constitutes the primary element for controlling the gear shift of an automatic transmission. The valve body is a complicated mechanical structure, and adjustments and corrections of the mode and manner of gear shifts in an automatic transmission by structural adjustments to the valve body itself is complicated, time consuming and expensive. It is therefore desirable to "design around" the valve body without making any substantial structural adjustments thereto when modification or correction of the shifting pattern of the automatic transmission is desired.

FIG. 1 of the drawing illustrates uncorrected engagement into reverse gear in an automatic transmission of the type installed by an original equipment manufacturer. As will be understood by those familiar with the art, reverse engagement of the transmission occurs through the movement of a reverse servo-apply piston driven by transmission fluid introduced through a feed or control orifice defined in a separator plate. The first phase of piston movement is referred to as the clearance stroke which is essentially free play or free movement of the piston before the transmission band engages a drum. Thereafter, further movement of the piston results in engagement, which continues until sufficient fluid pressure is established to complete the gear shift. As is evident from FIG. 1 of the drawing, the angle of engagement (the ratio of piston movement to time) is relatively steep and abrupt, and often results in a bump or noticeable slide because the torque-absorbing portion of the engagement stroke occurs too rapidly. Moreover, the large clearance distance over which the piston must travel requires that the feed or control orifice defined in the separator plate be correspondingly large to accommodate the flow of a sufficiently large quantity of transmission fluid to avoid time delays in reverse engagement.

Figure 2:
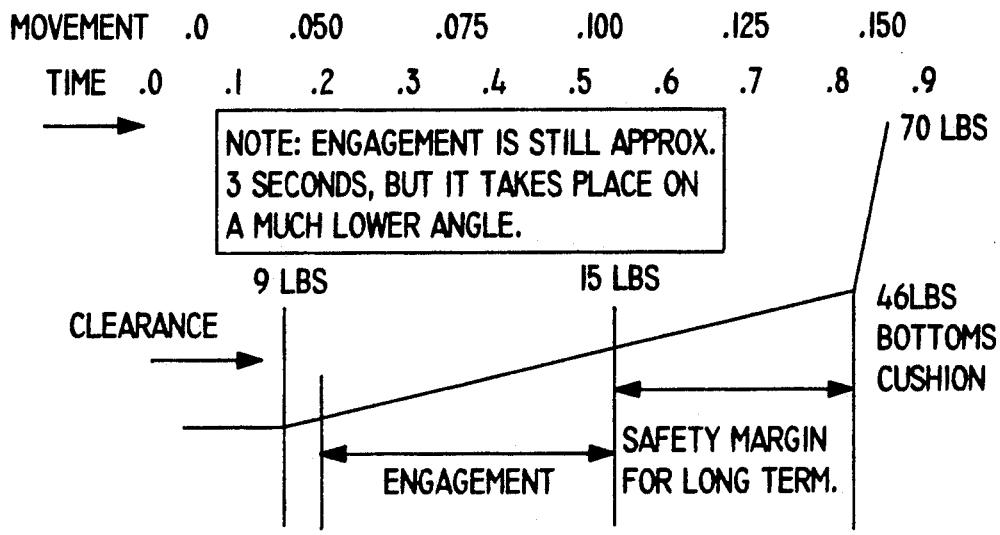
FIG. 2 is a graph showing reverse gear engagement as corrected in accordance with the present invention.

In accordance with the methods and systems of the present invention, the clearance travel of the reverse servo-apply piston is significantly reduced, as illustrated by FIG. 2 of the drawing. As a result of the reduced clearance travel, the engagement movement of the piston occurs over a longer period of time. Accordingly, the angle of engagement (the ratio of piston movement to time) is less than that of the original transmission (as illustrated by FIG. 1) resulting in a smoother engagement phase since the fluid pressure applied is increased more gradually over a larger time period. Thus, although the total time for a complete piston movement through clearance and engagement is approximately the same in FIGS. 1 and 2, the vast majority of travel time of the piston movement in FIG. 2 occurs during the engagement phase, and not during the clearance phase.

The reduction of the piston movement during clearance, and the resultant decrease in the engagement angle, (the ratio of applied pressure to piston distance travelled during engagement) is accomplished in several different ways. In the first instance, adjustments are made to an engagement pin carried by the reverse servo-apply piston so that engagement commences after a shorter distance of piston travel. Resilient means, preferably a series of compression springs opposing the movement of the piston and calibrated to match the pressure required for engagement, are installed in place of pre-existing springs. The springs provide improved control of piston movement during engagement to assure a smooth engagement. A servo-boost valve is provided to permit fluid to be applied to the servo-piston until a predetermined engagement fluid pressure is attained. Thereafter, the servo-boost valve automatically closes and all further fluid flow occurs through the control orifice in the separator plate. In this manner, an immediate increase in system pressure occurs during the reduced clearance phase to quickly commence the engagement phase, but final engagement is controlled by fluid feed through the control orifice in the separator plate to result in a more gradual and smoother final engagement. Since the clearance distance to be travelled by the piston has been significantly reduced, the size of the orifice and flow rate of the transmission fluid therethrough can be correspondingly reduced, thereby enabling the system to operate using a smaller overall quantity of transmission fluid, which further enhances the smooth and gradual engagement by permitting more precise control over the fluid pressure applied to the servo piston. The reduction in the quantity of transmission fluid needed for operation of the system advantageously tends to eliminate abrupt pressure drops in the system as a result of demands on the transmission pump in excess of the pump capacity, since the lesser pressure required to operate the system assures that the pump is operating below its maximum capacity.

FIG. 3 of the drawing illustrates a schematic diagram of a system in accordance with the present invention resulting in the reduced clearance stroke and the reduced applied pressure/time ratio illustrated by FIG. 2. FIG. 3A is an exploded view of the structural components employed in connection with the reverse engagement operation of the present invention. A cushion spring 2 and plurality of washers are mounted around an engagement pin 8 driven by a reverse servo-piston 6. A plurality of adjustment shims 9 are mounted around the engagement pin between the washers 4 and a shoulder 11 defined by the engagement pin. A plurality of return springs 10 are mounted proximate to the forward end 12 of the engagement pin, and exert a resilient force against the direction of movement of the reverse servo-piston. The engagement pin is not affixed to the piston head, and in operation, the cushion spring engages the piston head and the washers, the washers then engaging the return springs and/or the adjustment shims.

Figure 3A:
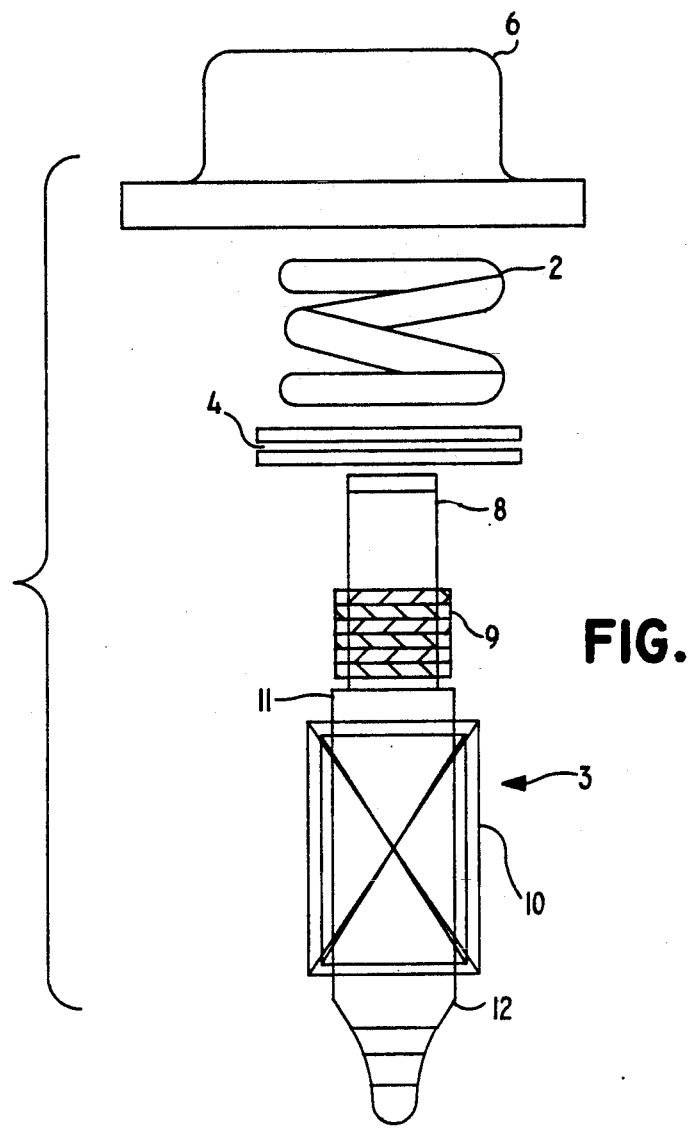
FIGS. 3A-3E are schematic drawings illustrating the corrected reverse engagement shown by FIG. 2.
Figure 3B:
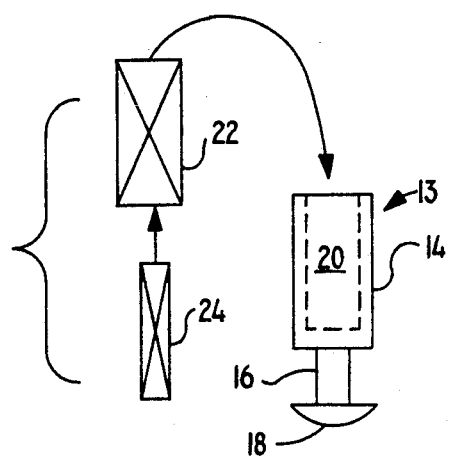

FIG. 3B is an exploded view of a reverse servo-boost valve 13 including a valve body comprising a shank 14, a spool 16, and a head 18. The valve body defines a spring pocket 20 for accommodating therein an outer spring 22 and an inner spring 24 received within the outer spring.

Figure 3C:
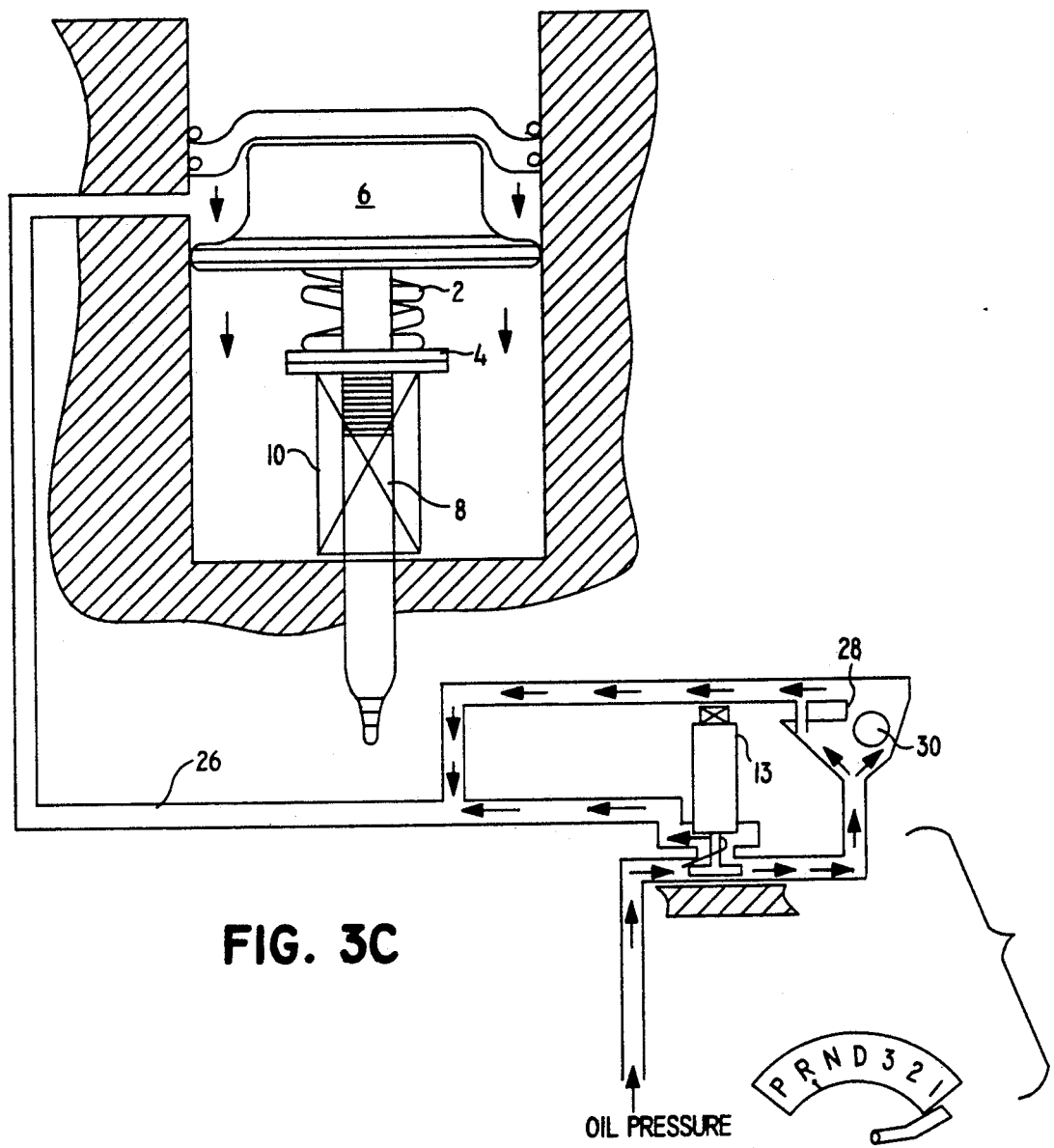

FIG. 3C is a schematic view of reverse engagement illustrating transmission fluid flow. As illustrated in the drawing, the servo-valve 13 is open and permits fluid to flow through it. Fluid flows through the valve into the reverse servo-piston 6, and is met by the resistance of the return springs 10 opposing downward movement of the piston. When a predetermined threshold pressure (e.g., 14 p.s.i.) is established in the line 26 between the valve and the piston 6, the valve is automatically closed and all further fluid flow occurs exclusively through a control orifice 28 once a check ball 30 has been seated. Fluid flow through the control orifice 28 corresponds to the commencement of the engagement stroke of the reverse servo-piston. This fluid flow, together with the opposed force of the return springs 10 on the reverse servo-piston 6, controls the speed of movement of the servo-piston during the reverse engagement phase to assure gradual and smooth increases in applied fluid pressure to result in smooth engagement. In the event that further engine torque/power is applied, the reverse servo-booster valve 13 senses the pressure increase and again opens to allow rapid application of transmission fluid from the transmission pump and through the valve 13, bypassing the control orifice 28, to provide increased fluid pressure and flow to the reverse servo-piston 6 to prevent the slipping of the reverse band.

Figure 3D:
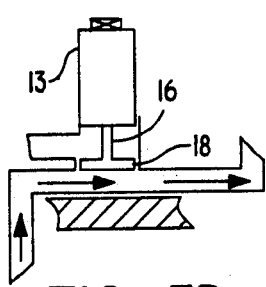
Figure 3E:
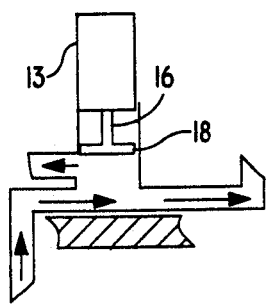

FIGS. 3D and 3E schematically illustrate the position of the reverse servo-valve 13 when the valve is closed (and all fluid flow is channelled through the control orifice 28) and when the valve is open (thereby channelling fluid flow through the valve 13 and by-passing the control orifice 28), respectively.

Figure 4:
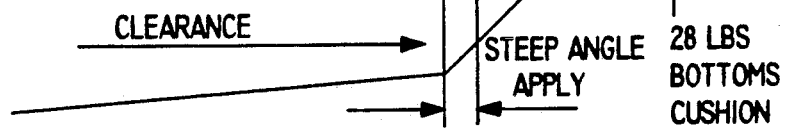
FIG. 4 illustrates a graph showing uncorrected drive (forward) engagement.
Figure 5:
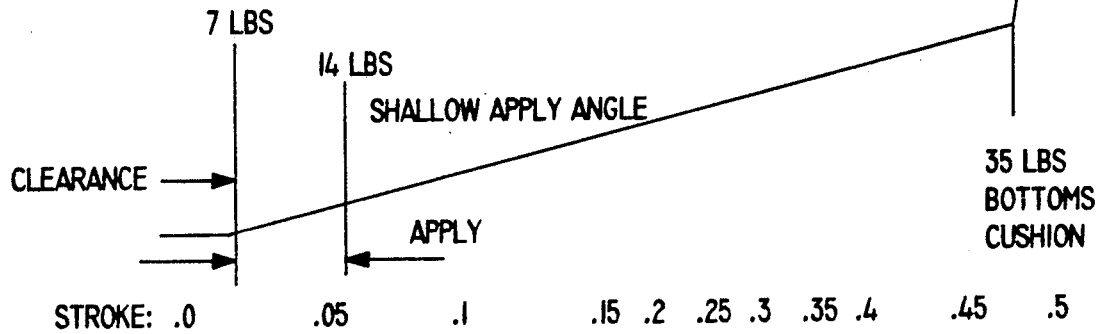
FIG. 5 illustrates a graph showing corrected drive (forward) engagement in accordance with the present invention.
Figure 6A:
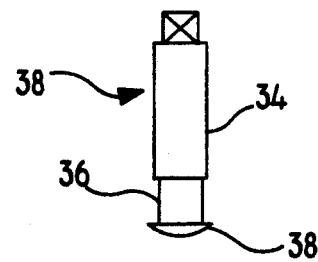
FIGS. 6A-6E schematically illustrate servo-boost valve operation during forward engagement in accordance with the present invention.
Figure 6B:
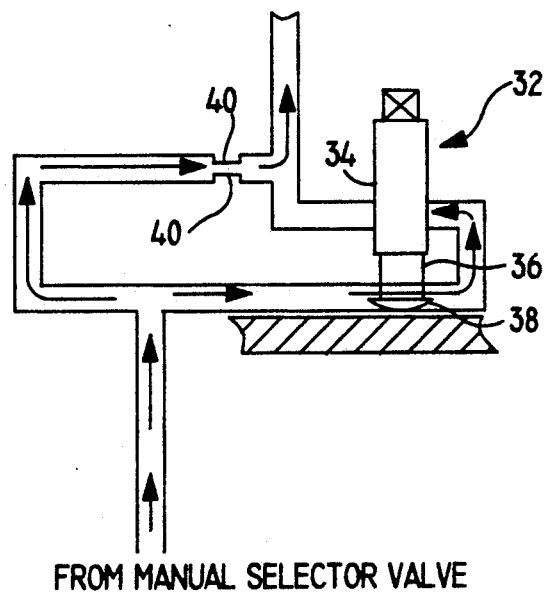
Figure 6C:
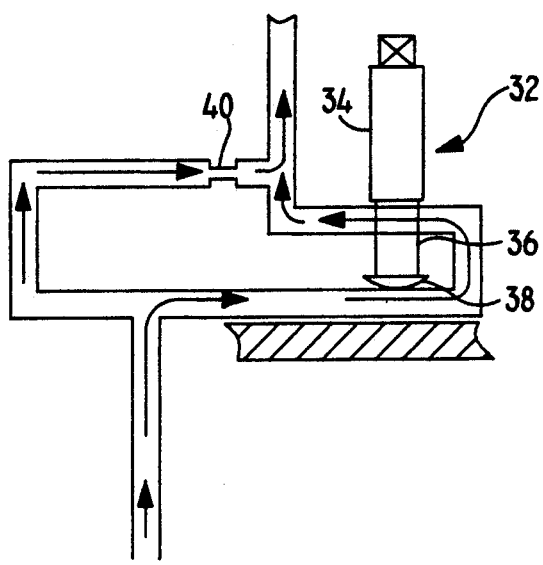
Figure 6D:
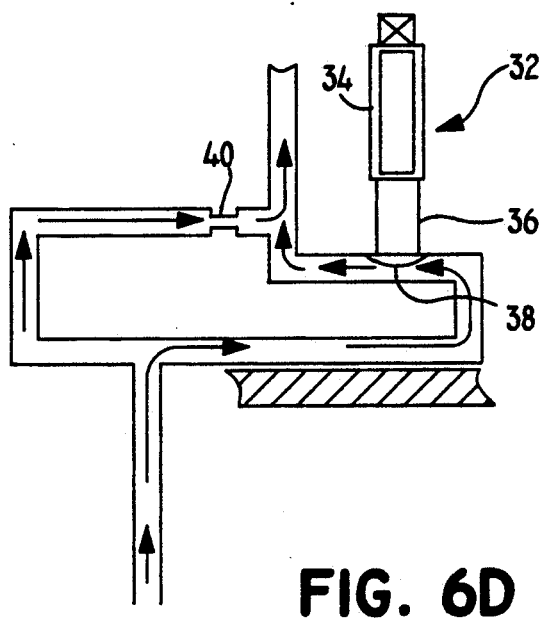
Figure 6E:
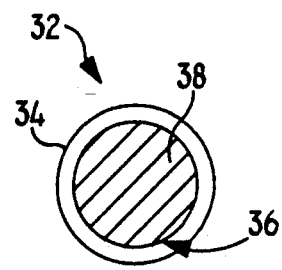

FIGS. 4 and 5 of the drawing illustrate graphs similar to those of FIGS. 1 and 2 respectively, showing uncorrected and corrected drive engagement. As is apparent from FIG. 4, the clearance distance of the piston stroke is relatively long, and the engagement angle, representing the ratio of system pressure buildup to time, is relatively steep.

FIG. 5 illustrates the pressure/application time ratio for drive engagement of the automatic transmission illustrated by FIG. 4, as corrected and modified in accordance with the method and system of the present invention. Although the overall time required for total drive engagement for the corrected transmission is substantially identical to the total time for drive engagement of the uncorrected transmission, it is apparent that the engagement phase of the piston travel is substantially longer for the corrected transmission than for the uncorrected transmission. Accordingly, the ratio of pressure application/time (or distance travelled by the piston during the engagement stroke) is substantially less for the corrected transmission, thereby resulting in a smoother, more continuous drive engagement. The longer pressure application period during the overall drive engagement procedure is attained by adjusting the position of an engagement pin carried by a forward servo-piston to expedite the commencement of the forward engagement stroke. A servo-boost valve is provided to supplement fluid pressure applied to the servo-piston through control orifices to control the overall rate of fluid pressure applied to the servo-piston. Unlike the factory installed transmission which provides only an "on/off" type valve to supplement orifice fluid flow, the valve provided by the present invention controls the supplemental fluid flow to more precisely compensate for pressure changes in the system during drive engagement. Preferably, the valve is dimensioned to provide a second control orifice in its fully opened position. As illustrated by the sequence of FIGS. 6A-6E, the position of the valve controls the rate of fluid flow through the valve. As shown in the drawings, the valve 32 includes shank 34, a spool 36, and a head 38, each of which has a different outer dimension. The shank portion is employed to completely block fluid flow in the closed position of the valve, the spool portion is employed for maximum fluid flow through the valve, and the head portion is employed for intermediate fluid flow through the valve.

The size of a control orifice 40 is reduced to reduce the quantity and flow of transmission fluid through the orifice, thereby enhancing the gradual and continuous increase in line pressure during the extended drive engagement phase. Resilient means may be provided to oppose the movement of the servo-piston to counteract the force of the transmission fluid to match the actual pressure required for drive engagement, further enhancing the gradual pressure increase in the system. The net result of the modification provided by the method and system of the present invention, similar to that provided for the reverse engagement, is an overall engagement stroke of a servo-piston which is completed within the same time period as that of the original uncorrected transmission, but which results in a smoother, more continuous and efficient shift.

In a further aspect of the present invention, the servo-boost valve of the type described above, is employed to coordinate the pressure rise system to perform several different functions. For example, during no load (idle or high vacuum), the servo-boost valve remains closed and the servo-piston is fed directly through the control orifice of the separator plate. If a driver moves the gear shift lever of the automatic transmission to drive and applies throttle by depressing the accelerator pedal before the transmission drive band is applied, the increase in line pressure opens the servo-boost valve and immediately feeds full fluid flow to the band to prevent delay in drive engagement.

The servo-boost valve also avoids dangerous pressure drops during downshift. For example, to prevent rough downshift during the operation of an air conditioned vehicle, the calibration of the control orifice is raised to 88 pounds. To prevent bang if the drive happens to apply throttle during the coast 3-2 downshift, the servo-boost valve is wide open between 88-135 pounds. At 135 pounds, the valve resizes the flow to control the speed of the 1-2 band applied during 4-2 and 3-2 kickdown. Therefore, the valve function is coordinated with changes in the valve body, the servo, and the channel plate, to control shift feel and avoid dangerous pressure drops in the system.

As discussed herein, a significant feature of the method and systems discussed herein is a reduction of approximately 40-50% in volume of the transmission fluid necessary for the operation of the transmission in conjunction with a corresponding reduction in the size of the control orifice. The reduction in volume of transmission fluid brings the system within the safe limits of pump capacity and tends to significantly reduce abrupt drops in line pressure resulting from pressure demands of the operating system which exceed the capacity of the pump. As discussed herein, reduction of total fluid volume and corresponding reduction in control orifice size, in operative association with a servo-boost regulating valve, results in both improved reverse engagement and improved drive engagement. Corresponding considerations must also be made with respect to downshift. Adjustments to the exhaust ports for transmission fluid during downshift must be adjusted in proportion to the adjusted control orifice in the separator plate and the reduced overall volume of transmission fluid present in the operating system. For example, if the original volume of transmission fluid required for a 4-2 downshift is 9 cubic inches, the reduced volume for a similar downshift in the modified system is approximately 4 cubic inches. Similarly, a 3-2 downshift requiring approximately 5 cubic inches of transmission fluid in the original system, requires only approximately 2.6 cubic inches of fluid in the modified system. As a result of the reduced volume of transmission fluid required for downshifts in the modified system, it is possible to control the time and the feel of the downshift while staying safely below the capacity of transmission fluid to be delivered by the pump to maintain enough line pressure to keep the 2nd (or input) clutch from slipping. As a result, the downshift is primarily controlled by the volume of transmission fluid within the system, and the size of the control orifice. During downshift operations, particularly during a 4-2 or a 3-2 kickdown, the servo-boost valve is operating in conjunction with the control orifice size to regulate the flow rate of transmission fluid to enhance a smooth and gradual downshift operation and avoid any abrupt changes in line pressure.

In a further aspect of the present invention, the pre-existing modulator system, which controls an accumulator valve to control the gear shift, is disconnected from the modulator system. The accumulator valve is placed in direct communication with the control orifice through which the transmission fluid flows. In this manner, better adjustment may be made to the accumulator valve through the fluid flowing through the control orifice. Accordingly, the overall system is rendered more flexible and easier to correct or modify by a mechanic who is required to only adjust the size of the orifice to control or modify the shift. It is not necessary to remove the valve body itself since the adjustments may be made externally from the valve body.

The reduced volume of transmission fluid necessary for both upshifts and downshifts result in a further advantage to the overall system by eliminating or reducing lockup converter failure. As known to those skilled in the art, and as more fully discussed in the aforementioned TRANSGO ® publication, lockup converter failure occurs when the demand for transmission fluid in the system exceeds the capacity of the pump. As a result, insufficient fluid is provided to the converter front, thereby resulting in the accidental glazing of the lockup plate which ultimately results in the development of a shudder. This problem is avoided in accordance with the method of the present invention since the reduction in the volume of oil necessary to effect an upshift or downshift is reduced well below the maximum pump capacity, thereby assuring that the pump retains the capability of providing adequate front oil pressure to the converter at all times during operation of the system.

Other modifications and advantages of the methods and system disclosed herein falling within the scope of the present invention will become apparent to those skilled in the art. Accordingly, the discussion of the best modes of the invention made in the present specification and the attached Appendix A have been intended to be illustrative but not restrictive of the scope of the invention, that scope being defined by the following claims and all equivalents thereto.

I claim:

1. A method of modifying an automatic transmission of an automotive vehicle to improve gear engagement, said automatic transmission including a servo-piston movable through a piston stroke comprising a clearance stroke and an engagement stroke to effect gear engagement, said piston being movable in a first predetermined direction through said clearance stroke and said engagement stroke by fluid pressure applied thereto, said servo piston driving an engagement pin in the same direction of movement as said servo pisto, said method comprising the steps of adjusting said piston stroke by:

applying a resilient force to said servo-piston through said engagement pin in a direction opposed to said first predetermined direction of movement of said servo piston to counteract said force applied to said servo-piston by said applied fluid pressure, and providing spacer means on said engagement pin for cooperating with said applied resilient force for adjusting the distance travelled by said servo-piston in said first predetermined direction during a time interval required to apply a predetermined fluid pressure to said servo-piston, wherein said servo-piston is a reverse servo-piston for reverse gear engagement, said reverse servo-piston being driven by the fluid pressure applied thereto, said method further including the steps of applying said fluid for driving said reverse servo-piston through a valve and selectively adjusting the fluid flow through said valve between at least two different predetermined operating positions corresponding to two different flow rates until a predetermined fluid pressure is established, and thereafter closing said valve to result in zero fluid flow therethrough and applying said fluid exclusively through at least one control orifice.

2. The method of claim 1 wherein said engagement stroke is equal to or greater than said clearance stroke.

3. The method of claim 2 further including the step of applying fluid pressure continuously to said servo-piston during said engagement stroke to avoid abrupt changes in applied fluid pressure.

4. The method of claim 1 wherein said fluid is applied through said control orifice during said engagement stroke of said reverse servo-piston.

5. The method of claim 4 wherein said fluid is applied at a slower rate through said control orifice than through said valve.

6. The method of claim 5 wherein the step of applying an opposed force to said reverse servo-piston includes the step of applying a resilient force to said reverse servo-piston in a direction opposed to said applied fluid pressure for controlling the rate of movement of said reverse servo-piston during said engagement stroke.

7. The method of claim 1 including the step of re-opening said valve for applying fluid through said valve to said reverse servo-piston in response to a predetermined decrease in fluid pressure applied through said control orifice.

8. The method of claim 1 further including the step of applying fluid pressure to said servo-piston by a volume of fluid selected to correspond with said adjustment of said piston stroke.

9. The method of claim 8 further including the step of applying said fluid pressure to said servo-piston by a volume of fluid within the range of 40%–50% of the volume of fluid applied to said servo-piston prior to the adjustment of said piston stroke.

10. The method of claim 1 further including the step of defining said control orifice by an opening of a predetermined size selected to correspond to said adjustment of said piston stroke, and applying said fluid through said control orifice in a volume selected to correspond to said adjustment of said piston stroke.

11. A method of modifying an automatic transmission of an automotive vehicle to improve gear engagement, said automatic transmission including a servo-piston movable through a piston stroke comprising a clearance stroke and an engagement stroke to effect gear engagement, said piston being movable in a first predetermined direction through said clearance stroke and said engagement stroke by fluid pressure applied thereto, said servo piston driving an engagement pin in the same direction of movement as said servo piston, said method comprising the steps of adjusting said piston stroke by;

applying a resilient force to said servo-piston through said engagement pin a direction opposed to said first predetermined direction of movement of said servo piston to counteract said force applied to said servo-piston by said applied fluid pressure, and providing spacer means on said engagement pin for cooperating with said applied resilient force for adjusting the distance travel by said servo-piston in said first predetermined direction during a time interval required to apply a predetermined fluid pressure to said servo-piston, wherein said servo-piston is a forward servo-piston for effecting forward drive engagement of said transmission, said method further including the steps of applying said fluid for driving said forward servo-piston through at least one control orifice, providing means for supplementing the fluid applied to said forward servo-piston, and providing adjustable valve means for selectively controlling the flow of said means for supplementing said fluid applied to said forward servo-piston between at least two different flow rates other than zero flow.

12. The method of claim 11 further including the step of adjusting the flow rate of fluid through said valve means in response to pressure changes.

13. The method of claim 11 further including the step of defining said control orifice by an opening of a predetermined size selected to correspond to said adjustment of said piston stroke, and applying said fluid through said control orifice in a volume selected to correspond to said adjustment of said piston stroke.

14. The method of claim 11 wherein said engagement stroke is equal to or greater than said clearance stroke.

15. The method of claim 14 further including the step of applying fluid pressure continuously to said servo-piston during said engagement stroke to avoid abrupt changes in applied fluid pressure.

16. The method of claim 11 further including the step of applying fluid pressure to said servo-piston by a volume of fluid selected to correspond with said adjustment of said piston stroke.

17. The method of claim 16 further including the step of applying said fluid pressure to said servo-piston by a volume of fluid within the range of 40%-50% of the volume of fluid applied to said servo-piston prior to the adjustment of said piston stroke.

18. In a system for improving reverse gear engagement in an automatic transmission for automotive vehicles of the type including a reverse servo-piston for effecting reverse gear engagement and means for driving said reverse servo-piston through an engagement stroke by fluid pressure applied thereto, the improvement comprising:

adjustable valve means for controlling the fluid pressure applied to said reverse servo-piston, said valve means including control means for selectively switching said valve means between at least two different predetermined operating positions for adjusting the rate of fluid flow through said valve means between at least two different predetermined flow rates other than zero flow, said control means providing means for selecting one of said predetermined operating positions of said valve means resulting in one of said predetermined flow rates through said valve means, said control means allowing fluid flow through said valve means until a predetermined fluid pressure is applied to said reverse servo-piston and thereafter closing said valve means to prevent further fluid flow therethrough, and a control orifice in fluid communication with said reverse servo-piston for supplying fluid to said reverse servo-piston, said fluid being supplied to said reverse servo-piston exclusively through said control orifice after said predetermined fluid pressure has been applied to said reverse servo-piston and said valve means has closed to prevent fluid flow through said valve means.

19. The system of claim 18 wherein said control means includes sensor means for re-opening said valve means to increase fluid flow to said reverse servo-piston in response to a sensed predetermined decrease in fluid pressure applied to said reverse servo-piston through said control orifice.

20. The system of claim 18 wherein said valve means is calibrated such that said predetermined applied pressure is attained at the commencement of said engagement stroke of said reverse servo-piston.

21. The system of claim 18 further including resilient means acting on said reverse servo-piston in a direction opposed to that of said applied fluid pressure, said resilient means being calibrated to control the movement of said reverse servo-piston during said engagement stroke.

22. In a system for improving drive gear engagement in an automatic transmission for automotive vehicles of the type including a forward servo-piston for effecting drive gear engagement and means for driving said forward servo-piston through an engagement stroke by a first applied pressurized fluid, the improvement comprising:

at least one control orifice in fluid communication with said forward servo-piston for applying said first pressurized fluid to said forward servo-piston, and valve means for variably controlling a supplemental pressurized fluid applied to said forward servo-piston for varying the fluid pressure applied to said forward servo-piston, said valve means including control means for selectively switching said valve means between at least first and second operating positions for varying the flow rate of said supplemental pressurized fluid flow through said valve means between at least two different predetermined flow rates other than zero flow.

23. The system of claim 22 wherein said valve means includes means for applying said supplemental pressurized fluid to said forward servo-piston in response to a predetermined decrease in the fluid pressure applied to said forward servo-piston by said first pressurized fluid through said control orifice.

* * * * *